April 27, 1943.  C. J. WESTIN  2,317,839
OPERATION CHECK FOR AUTOMATIC MOLDING PRESSES
Filed July 5, 1940  2 Sheets-Sheet 2

Inventor
Charles J. Westin,
By Ralph B. Stewart
Attorney

Patented Apr. 27, 1943

2,317,839

UNITED STATES PATENT OFFICE 2,317,839

OPERATION CHECK FOR AUTOMATIC MOLDING PRESSES

Charles J. Westin, Philadelphia, Pa., assignor to F. J. Stokes Machine Company, a corporation of Pennsylvania Application July 5, 1940, Serial No. 344,173

9 Claims. (Cl. 18—16)

My invention relates to the automatic molding machines such as presses suitable for molding articles from thermoplastic or thermosetting materials in which a succession of individual articles, or a succession of batches of articles, are molded through the application of heat and pressure.

More specifically, my invention relates to an "operation check" or control means actuated by the proper ejection of each of the articles or batches of articles in succession from the mold, and serving to control the motive power of the press and continue the press in operation so long as an article is properly discharged in each cycle, but stops the operation of the press upon failure to properly discharge an article in any cycle.

For carrying out these purposes, I provide adjacent the offtake or discharge end of the press or molding machine an adjustable conveyor located so as to receive and convey away from the machine articles which have been molded in the machine and properly ejected and discharged therefrom. Adjacent this conveyor I provide a source of light arranged to shed a more or less concentrated beam or ray of light across or adjacent to the conveyor. Also adjacent the conveyor and opposite or juxtaposed to said source, I provide a light-sensitive element on which the beam or ray of light from said source falls, or is reflected, subject to being diminished or cut off or reflected by one or a plurality of molded articles from the machine passing along the conveyor. The light-sensitive element controls the source of power for driving the press and continues the operation of the press from one cycle to another each time an article is discharged therefrom, but operates to stop the press upon failure of the press to discharge an article in any cycle. By preventing operation of the press until it is properly cleared in each cycle, serious damage to the press by jamming is avoided.

One embodiment of my invention consists in the provision of suitable means to discharge a molded article as ejected from the mold in a desired or predetermined direction, guiding the article through or over a conveyor so as to reduce or eliminate the light value of a light source affecting a light or color sensitive element connected into a control circuit and interlocked with the switching mechanism of the power circuit for driving the press, the arrangement being such that the power circuit will be interrupted and the press stopped whenever a molded article is not properly discharged in any cycle of the press.

In another embodiment of my invention, the passage of a properly ejected molded article along the conveyor serves to reflect a beam of light upon a normally inactive photoelectric cell, and the cell operates to continue the operation of the press through another cycle or until there is a failure to discharge an article in any cycle.

This application is, in part, a continuation of my application Serial No. 263,820, filed March 24, 1939.

Various forms of my "operation check" are illustrated in the accompanying drawings in which:

Figure 1a illustrates a modified arrangement of conveyor, light source and light-sensitive cell, employed in another form of operation check according to my invention;

Figure 4 is a circuit diagram illustrating a circuit arrangement for use in connection with the arrangement shown in Figure 1a.

Figure 1:
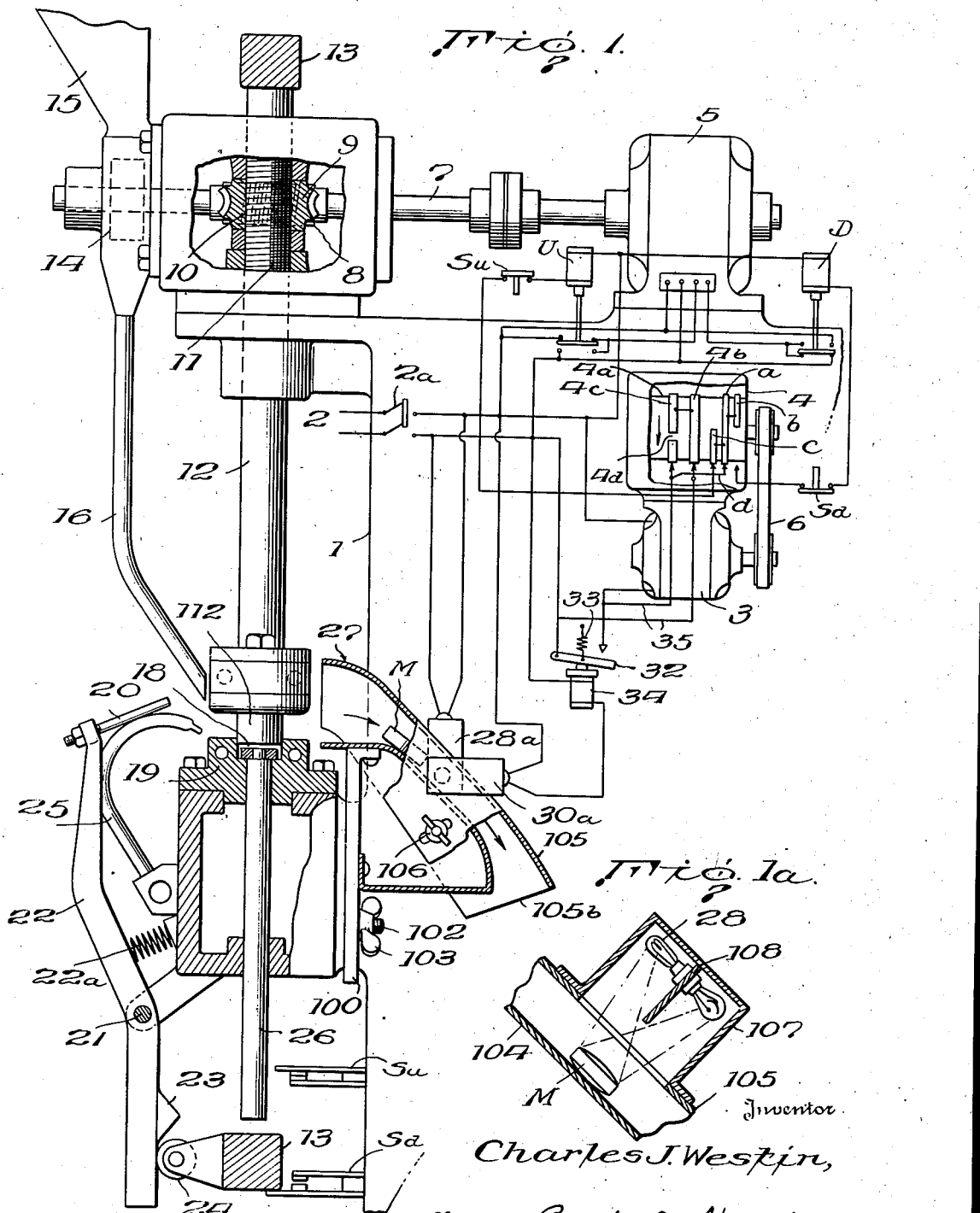
Figure 1 is a diagrammatic view showing one form of operation check applied to one form of automatic molding press.
Figure 2:
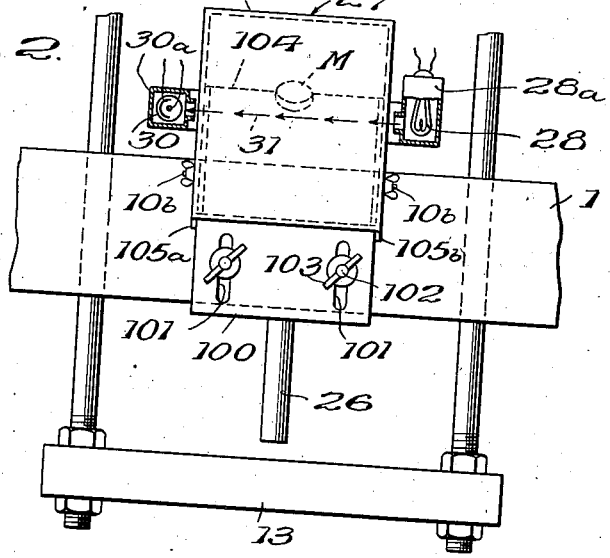

Referring to the drawings, for the purpose of illustration only, I have shown in Figure 1 the details of construction of an automatic press with one form of my operation check applied thereto, but it will be understood that the operation check may be applied to other forms of automatic presses. The automatic press is provided with a support or base 1 on which the various parts are mounted. The press is driven from a suitable source of power illustrated by the electric circuit 2 driving a reversible power motor 5 through a controller 4, the controller 4 being driven by the control motor 3 through a suitable drive represented by the belt 6.

Press motor 5 drives shaft 7 carrying worm 8 which meshes with a worm-gear 9, having on its inner surface screw-threads 10 coöperating with screw-threads 11 on ram 12. Ram 12 has connected thereto a frame 13 which is raised and lowered together with ram 12, thereby furnishing means for lifting the molded part out of the mold cavity. Shaft 7 carries at its outer end a valve 14 which controls the supply of molding material from a hopper or other storage space 15 through a chute or other feeding device 16 to a mold cavity indicated at 18 and formed between the lower end punch 112 carried by ram 12 and the upper face of the stationary body or platen 19. Air jets 25 are provided to discharge the finished molded article from the mold into conveyor 27. Air jets 25 are operated at predetermined points in the molding cycle through a valve controlled by controller 4 so as to furnish a large volume of air at sufficient pressure to discharge the molded piece as it is lifted out of the mold cavity by bottom ejector 26 or is stripped from the punch by the top ejector (not shown). Adjacent the mold cavity 18 there may be provided a stripper 20 pivotally mounted on shaft 21 by means of lever 22 which carries on the opposite side of pivot 21 a projection or cam face 23 arranged so as to be engaged by a cam roller 24 carried on frame 13 and thereby stripper 20 is moved against the pressure of a spring 22a to a position over the mold cavity 18 where it assists the ejecting means and the air jets 25 in discharging the molded piece in the proper direction.

The molded article (or a plurality of molded articles) ejected from mold cavity 18 is discharged by air jets 25 to a conveyor 27 of such construction that it will guide the molded piece through the light beam of the operation-check switching-mechanism. As molding machines are called upon to handle an infinite variety of sizes and shapes in molded articles. the conveyor is suitably and conveniently adjustable so as to properly guide the discharged article or articles through the light beam. Conveyor 27 consists of a plate or support member 100 having longitudinal slots 101 therein through which project bolts 102 with which cooperate winged nuts 103 for adjustably securing the conveyor relative to the mold cavity 18. On plate 100 is mounted the conveyor proper which is formed as a chute and consisting of a bottom wall formed of curved wires or a curved sheet 104 along which the molded articles M, which have been properly ejected and discharged from the machine, are guided by a guide consisting of a top plate on wall 105 having depending sides 105a and 105b embracing the bottom plate 104. Guide 105 is adjustably supported upon plate 104 by screws 106 to accommodate different sizes of molded articles. By such an arrangement of adjustable members a tunnel or chute is provided, conveniently adjustable to suit any molded article, which will constrain the molded article M to travel along surface 104 and thereby vary the value of the light beam described below. Conveyor 27 may, however, be of any convenient type such as a chain or belt or disk or other traveling part, which receives the articles as they are discharged from the press and carries them through the beam of light which controls the photoelectric cell.

Mounted adjacent conveyor 27 is a light source shown as consisting of an electric bulb 28 enclosed in a suitable housing 28a and connected across line 2. Opposite light source 28 there is provided a light-sensitive element such as a photoelectric cell 30 enclosed in a suitable housing 30a and arranged to receive light-beam 31 from source 28.

The light-sensitive element 30 may be any one of a number of such devices now available on the market and extensively used in a variety of applications for counting or checking operations. Through my invention the light-sensitive element is made to act regardless of size, shape or color of an article by properly mounting the light source and the light-sensitive element in a suitable adjustable manner adjacent the conveyor and the novel arrangement of the means for ejecting and discharging cooperating with the conveyor.

Control motor 3 is connected across line 2 in series with a switch 32 which is biased as by a spring 33 to closed position. Relay winding 34 is connected across line 2 in series with light-sensitive element 30. The relay comprising elements 32—33—34 is of the time delay type in which the contacts close quickly and open slowly.

The controller 4 for controlling the operation of the power motor 5 may be of any suitable construction for controlling the circuit to the motor 5 to operate the press through successive cycles automatically. The controller may assume a variety of different forms, but for the purpose of illustration, the controller is shown as consisting of a rotary drum 4a driven by the constant speed control motor 3 and carrying suitable insulated conducting rings or segmented rings for accomplishing the desired switching operations, either directly or through suitable relays. The "up" relay U for motor 5 is controlled by rings a and c on controller 4, and the "down" relay D for motor 5 is controlled by rings a and b of controller 4. These rings may be formed with different segment arrangements to provide for a curing period when the mold is closed, or to open the mold for a breathing period during each cycle. The segments of rings b and c should not overlap.

The controller 4 also embodies a continuous ring 4b and a broken ring 4c having a gap 4d formed therein, these two rings being connected together by suitable jumper connections. The brushes for rings 4b and 4c are connected in parallel to the contacts on relay 32—33—34 by wires 35. With the arrangement as shown, controller rings 4b and 4c normally complete the energizing circuit to motor 3 through the wires 35, but the circuit to motor 3 is interrupted at one point in each cycle of operation of the press when gap 4d moves into a position under the brush associated with the ring 4c. In this position of controller 4, the circuits to relays U and D controlling power-motor 5 are also interrupted at gap 4d if switch 32 remains open, and motor 5 will stop, it being noted that the circuits for relays U and D are connected in parallel with motor 3 and controlled by either ring 4c or switch 32. It will be understood that for each revolution of the drum 4a of the controller, the circuit to power-motor 5 is controlled to drive the press through a complete cycle of operation to mold and discharge therefrom a molded article. The arrangement is such that a molded article is discharged from the press at the instant, or just before the instant, that gap 4d moves into position under the brush for ring 4c. The beam from light source 28 normally energizes the photoelectric cell 30 which in turn normally energizes winding 34 of relay 32—33—34 and maintains the contacts of this relay normally open. The passage of an article through chute 27 momentarily de-energizes winding 34 and permits the closing of contacts 32 which remain closed long enough for gap 4d to move past the brush for ring 4c, thus continuing the energization of motors 3 and 5 through another cycle.

The operation of my device is believed to be clear from the foregoing description. A starting switch 2a is closed and connects the line 2 with control-motor 3, power-motor 5, and controller 4. If the safety switches or devices are in proper position, the cycle of molding operation starts upon operation of press-motor 5, causing valve 14 to supply a charge of molding material from hopper 15 through chute 16 to mold cavity 18. At the same time, ram 12 and frame 13 are lowered until punch 112 enters mold cavity 18 and compresses the charge therein. As soon as the required pressure for closing the mold and forming the molding compound has been built up by the forward action of motor 5, a suitable limit switch Sd, or similar device, stops motor 5 for the period of time required to cure the molding material. Switch Sd is shown in position in the lower part of Figure 1 to be operated by frame 13, but it may be operated by any other suitable part of the press. This switch is also represented in the circuit diagram of Figure 1. This time period may be only a few seconds for small and light-walled articles, while for large and heavy pieces several minutes may be required. Curing is accomplished by heat supplied from heating means embodied in the two mold parts in the usual manner. After the elapse of the curing time, which may be determined by controller 4, or by a separate time-controlled controller, the controller 4 starts motor 5 in the reverse direction by energizing relay U through controller ring b; the mold is opened, and the molded article is lifted out, either by punch 112 or ejector 26, and at the proper moment the air jets from nozzles 25 discharge the piece through conveyor 27. With complicated pieces, there sometimes is danger of these pieces sticking either on punch 112 or ejector 26 and, in such cases, use is made of stripper 20 to cooperate with the air jets from nozzle 25.

A suitable limit switch Su, shown in the lower part of Figure 1 as being positioned to be opened by frame 13, opens the circuit of "up" relay U and stops motor 5 in case the circuit of relay U is not opened by controller 4 before frame 13 reaches switch Su. This switch is also represented in the circuit diagram embodied in Figure 1. The molded article passes along conveyor 27 and interrupts or partially interrupts or diminishes the beam of light passing from light source 28 to light-sensitive element 30, and thus effects the closing of switch 32. Simultaneously, with the discharge of the article from the press, or immediately following such discharge, the circuits to motor 3 and to relay U are opened at gap 4d. However, where an article is properly discharged, these circuits remain completed through contact 32 which remains closed long enough for gap 4d to pass from under the brush. The operation of the press is thus continued through another cycle. If, however, an article sticks in the press, or the supply of molding material runs out, relay 32—33—34 remains energized, holding contact 32 open, and the circuits of motor 3 and relay U are interrupted at gap 4d, whereupon both motors stop and controller 4 stops in a position where the circuits of motor 3 and relays U and D are open and can be closed only by closing switch 32. The operation of the press is thus stopped until an attendant discovers and remedies the disorder. After the disorder has been remedied, the press may be started again by manually inserting a molded piece into chute 27, thereby interrupting beam 31 and causing operation of switch 32.

The control circuits and rings for controlling air jets 25 have not been shown since they are conventional.

Figure 3:
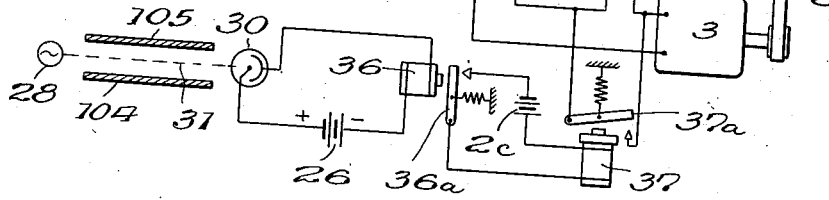
Figure 3 is a circuit diagram illustrating a modified control circuit for use in connection with the arrangement shown in Figure 1.

Figure 3 shows a modified circuit arrangement for use in connection with Figure 1. In this arrangement parts corresponding to similar parts in Figure 1 are indicated by the same reference numerals. The photo cell 30 is connected to control a relay 36, a source of power represented by the battery 2b being included in the circuit. The armature 36a of relay 36 is normally biased to closed position, but the energizing current flowing through the cell 30 maintains the armature contact in normally open position. Armature 36a controls an energizing circuit for relay 37 which circuit includes a source of current represented by the battery 2c. The armature 37a of relay 37 is arranged to short circuit the wires 35 leading to rings 4b and 4c on the controller drum 4a. Armature 37a is normally biased to open position as shown. Relay 37 is of the time delay type which closes or picks-up quickly and is slow to release.

Operation of Figure 3 will be understood from the foregoing description of operation of Figure 1. The normal circuit arrangement is as shown in Figure 3 where relay 37 is de-energized and armature 37a is released. In the normal operation of the press, a molded article will be discharged from the press and will pass through the beam 31 at a time just before or simultaneously with the instant the gap 4d in ring 4c moves under the brush associated with this ring, and interruption or variation of the beam 31 causes relay 36 to release and close the circuit of relay 37 for an instant. This results in the closing of armature 37a for a period of time sufficient to continue the operation of motor 3 and allow the gap 4d to move beyond the brush of ring 4c. If no article is discharged in any cycle, motor 3 will stop due to interruption of its circuit by gap 4d.

While I have shown the lamp 28 and the cell 30 arranged so that the beam 31 traverses the chute in a horizontal direction, it will be understood that these elements may be positioned so that the beam traverses the chute in a vertical or semi-vertical direction. The essential consideration is that the beam shall traverse the chute so that it will be varied by the passage of an article M through the chute.

Instead of arranging the light beam to fall directly upon the cell and be interrupted or intercepted by the molded article, I may so arrange the source of light and the photo-electric cell that the beam does not normally impinge upon the cell, but when a molded article moves into the path of the beam, the cell responds to light reflected from the molded article. In Figure 1a, I have illustrated an arrangement which operates in this manner. The bottom wall 104, and the top wall 105 of the chute are the same as in Figure 1, except that the top wall 105 has an aperture formed therein, and the aperture is covered by a light-tight casing 107 which is divided into two compartments by a partition 108. The lamp 28 is mounted in one compartment, while the photoelectric cell 30 is mounted in the other compartment, the two elements being so mounted that the cell 30 cannot receive any direct light from the lamp 28. Also, the inner surface of the chute 104—105, as well as the inner surface of the casing 107, is blackened to prevent reflection of light from these surfaces and thereby affecting the cell 30. As shown in Figure 1a, when a molded article M passes along the chute, light is reflected from the article and a portion of this reflected light falls upon the cell 30 and is sufficient to operate the cell. It is not necessary that the article M be totally reflective, but the arrangement will operate even where the light reflected from the article M is of a diffused nature. Instead of using a visible light, the lamp 28 may emit infra-red rays if desired, in which case the cell 30 would be selected to be responsive to infra-red rays.

Figure 4:
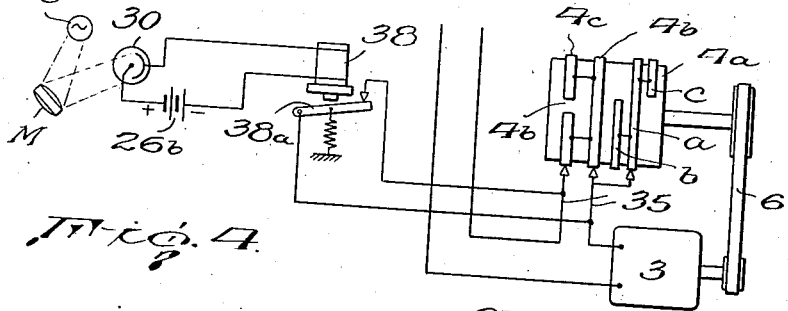

Since the cell 30 in Figure 1a is not normally energized by the light beam, a somewhat different circuit arrangement is required, and a suitable circuit is illustrated in Figure 4. In this arrangement, the cell 30 controls a relay 38 which has an armature 38a normally biased to open position, but arranged to short circuit leads 35 when the relay is energized. Relay 38 is of the time delay type which closes quickly and releases slowly.

In the normal operation of Figure 4, the cell 30 is not energized, and armature 38a is released. At the instant that gap 4d comes under the brush associated with ring 4c, or just before this instant, a mold article M passes along the chute and light reflected from the article energizes the cell 30 and operates relay 38 to short circuit leads 35. This short circuit continues for a short interval of time sufficient for the gap 4d to pass out from under the brush associated with the ring 4c. Should the press fail to discharge an article for any reason, the relay 38 would remain unoperated and the motor 3 would be stopped due to the interruption of its circuit by the gap 4d.

While I have described my invention in connection with a mechanical molding press driven by an electric motor, it is obvious that my device would be just as effective in connection with a hydraulic or combination hydraulic and mechanical press. In the type presses just referred to, the pressure exerted by the ram is obtained either from a hydraulic accumulator system controlled by valves or by some form of power-driven pump. It is evident that my invention can be modified without departing from the principles involved to control hydraulic valves if used, or the opening and closing of pump motor circuits, or to control any other type of prime mover.

Where the conveyor assumes the form of an inclined chute as shown in Figures 1 and 1a, the molded article influences the photoelectric cell only momentarily in its passage along the chute, and for this reason it is desirable to employ a time-delay relay in the control circuit to maintain the circuit of control motor 3 closed for a time sufficient for the gap 4d to move past the brush associated with ring 4c. By carefully timing the operation of the controller and the press, it might be possible to use ordinary relays controlling the circuit of motor 3, but the operation is more dependable where a time-delay relay is employed, as described.

What I claim is:

1. A machine for molding articles from plastic molding material comprising in combination, a mold, means for operating said mold through a complete cycle to mold an article and discharge said article from said mold, said means being effective to operate said mold throughout a complete cycle when once started, means for conveying said article from said mold along a predetermined path, means for directing a beam of light across said path, a light-sensitive element responsive to a momentary change in light conditions of said beam produced by passage of a molded article through said beam, and means including a time-delay relay controlled by said light-sensitive element in response to said momentary change in light condition for starting another cycle of said mold operating means.

2. A machine for molding articles according to claim 1 wherein the means for conveying the molded articles from the mold comprises a chute for directing the articles along a predetermined path, and wherein said light beam is arranged to traverse the passage in said chute.

3. A machine for molding articles according to claim 1 wherein the light-sensitive element is arranged in the path of said light beam, and wherein passage of a molded article along said conveying path operates to reduce the amount of light received by said light-sensitive element.

4. A machine for molding articles according to claim 1 wherein the light-sensitive element is shielded from the direct rays of said light beam, but is positioned to receive reflected light from the molded article as the article passes through said light beam.

5. In an automatic press for molding articles of plastic material, the combination of a mold having a movable part for opening and closing the mold, power means for operating said movable part, a controller for controlling said power means to operate said movable part through a complete cycle, an electric motor for driving said controller through successive cycles, an energizing circuit for said motor including contact elements on said controller for maintaining said circuit closed except for an interval at the end of each cycle of said press, a normally open switch for closing said motor circuit independently of said controller, means for conveying a molded article away from said press along a predetermined path, means for directing a beam of light across said path, a light-sensitive element responsive to changes in light conditions in said beam produced by passage of the molded article along said path, and means including a time-delay relay controlled by said light-sensitive element upon passage of a molded article along said path in any cycle for operating said switch to closed position and maintaining said switch in closed position during the interval when said motor circuit is open at the contacts of said controller.

6. A combination according to claim 5 wherein the normally open switch is biased to open position by mechanical means, and a normally de-energized relay is controlled by the passage of an article along the conveying path and operates to close said switch.

7. A combination according to claim 5 wherein said normally open switch is biased to closed position by mechanical means but is normally held in open position by the time-delay relay, said relay being normally energized by said light-sensitive element and being de-energized by the passage of a molded article along said conveying path.

8. In combination, a mold, means for operating said mold through a succession of cycles to mold an article and eject said article from said mold at the end of each cycle, means tending to stop said operating means for a predetermined time during each cycle, means for conveying said ejected articles from said mold along a predetermined path in spaced relation, means for directing a beam of light across said path, a light-sensitive element responsive to the momentary change in light conditions of said beam produced by passage of a molded article through said beam, and means including time-delay means controlled by said light-sensitive element in response to said momentary change in light condition for preventing the stopping of said operating means.

9. In an automatic molding machine, the combination of a mold, motor means for operating said mold through a complete cycle to mold an article, an electric circuit for controlling the energization of said motor means, control means for maintaining said circuit closed substantially throughout the cycle of said mold and for interrupting said circuit for a portion of said cycle, means for ejecting the molded article from said mold, an electrically operated time-delay relay having contacts for controlling said circuit independently of said control means, and means subject to momentary control by said molded article after ejection from said mold for controlling the energizing circuit of said time-delay relay to close said contacts just prior to the opening of said circuit by said control means, said time-delay relay serving to maintain said contacts closed during said portion of the cycle, thereby preventing interruption of said circuit so long as a molded article is ejected during each cycle.

CHARLES J. WESTIN.